US008589234B1

(12) United States Patent
Lee et al.

(10) Patent No.: US 8,589,234 B1
(45) Date of Patent: Nov. 19, 2013

(54) COMPANION AD AUCTIONS

(75) Inventors: Kyusoon Lee, Fort Lee, NJ (US);
Shanmugavelayutham Muthukrishnan, New York, NY (US);
Nemo Semret, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/273,485

(22) Filed: Oct. 14, 2011

(51) Int. Cl.
*G06Q 30/00* (2012.01)
(52) U.S. Cl.
USPC .................. 705/14.71; 705/14.69; 705/14.43
(58) Field of Classification Search
USPC ....................................... 705/14.71
See application file for complete search history.

(56) References Cited

U.S. PATENT DOCUMENTS

2004/0044571 A1* 3/2004 Bronnimann et al. .......... 705/14

OTHER PUBLICATIONS

Edelman et al., "Internet Advertising and the Generalized Second-Price Auction: Selling Billions of Dollars Worth of Keywords", The American Economic Review, vol. 97, No. 1, Mar. 2007, pp. 242-259.*

Cook, "Discover the key dates and info on the history of Thomas Cook", Thomas Cook Group, found on line at thomascook.com/about-us/thomas-cook-history/.*
Phillips et al., "The Development, Change, and Transformation of Rhetorical Style in Magazine Advertisements 1954-1999", J. Advertising, vol. 31, No. 4, Winter 2002, pp. 1-13.*
Rustichini et al., "Convergence to Efficiency in a Simple Market with Incomplete Information", Econometrica, J. Econometric Society, vol. 62, No. 5, Sep. 1994, pp. 1041-1063.*
Grolier, "Can You Display Multiple Ads on a Google Search Page?", DragonSearch, Apr. 8, 2010, on line at dragonsearchmarketing.com/can-you-display-multiple-ads-on-a-google-search-page.*
Edelman et al., "Internet advertising and the generalized second price auction: Selling billions of dollars worth of keywords", National Bureau of Economic Research No. w11765, 2005.*

* cited by examiner

*Primary Examiner* — John G Weiss
*Assistant Examiner* — Scott C Anderson
(74) *Attorney, Agent, or Firm* — Leason Ellis LLP

(57) ABSTRACT

Methods, systems, and apparatus, including computer programs encoded on computer storage media, for companion ad auctions. One of the methods includes conducting an online auction that allows bidders to bid on companioned advertisement slots on a web page. The method also includes determining a winning bidder for each of the companioned advertisement slots on the web page. The method also includes determining a price that each winning bidder pays for their respective advertisement slot or slots.

24 Claims, 5 Drawing Sheets

COMPANION AD AUCTIONS

BACKGROUND

This specification relates to content distribution.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

Advertisement slots can be allocated to advertisers through an auction. For example, advertisers can provide bids specifying amounts that the advertisers will respectively pay for presentation of their advertisements. In turn, an auction can be performed and the advertisement slots can be allocated to advertisers according to auction scores (e.g., bids received from the advertisers or scores that are computed as a function of the bids). When one advertisement slot is being allocated in the auction, the advertisement slot can be allocated to the advertiser that is the winning bidder (e.g., a bidder that is associated with a winning auction score). When multiple advertisement slots are allocated in a single auction, the advertisement slots can be respectively allocated to a set of winning bidders that are associated with winning auction scores (e.g., highest bids, highest auction scores, or highest values resulting from a function of, bids, auction scores, and/or other parameters). The bid that is associated with a winning auction score is referred to as a winning bid.

SUMMARY

In general, one innovative aspect of the subject matter described in this specification can be embodied in methods that include the actions of conducting an online auction that allows bidders to bid on companioned advertisement slots on a web page. Methods also include the actions of determining a winning bidder for each of the companioned advertisement slots on the web page. Methods also include the actions of determining a price that each winning bidder pays for their respective advertisement slot or slots.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination The companioned advertisement slots may include an overlay slot and a companion slot, and wherein determining a winning bidder for each of the companioned advertisement slots comprises allocating both the overlay slot and the companion slot to a single bidder. The companioned advertisement slots may include an overlay slot and a companion slot. Conducting the auction may include receiving bids for the overlay slot only, and receiving bids for both the overlay slot and the companion slot together. Determining the winning bidder for each companioned advertising slot may include comparing a maximum bid received for the overlay slot and the companion slot together with a maximum bid received for the overlay slot only. The methods may also include the actions of determining an expected maximum bid for the companion slot only. Determining the winning bidder for each of the companioned advertising slots may include comparing a maximum bid for both the overlay slot and the companion slot together to the sum of the maximum bid for the overlay slot only and the expected maximum bid for the companion slot only. Determining the winning bidder for each of the companioned advertisement slots may include allocating both the overlay slot and the companion slot to a bidder that submitted the maximum bid for both the overlay slot and the companion slot together if the maximum bid received for both the overlay slot and the companion slot together is greater than or equal to the sum of the maximum bid for the overlay slot only and the expected maximum bid for the companion slot only. The companioned advertisement slots may include an overlay slot and a companion slot. Conducting the auction may include receiving bids for the overlay slot only, receiving bids for both the overlay slot and the companion slot together, and receiving bids for the companion slot only. Determining the winning bidder for each of the companioned advertisement slots may include comparing the maximum bid for the overlay slot and the companion slot together to the sum of the maximum bid for the overlay slot only and the maximum bid for the companion slot only. Determining the winning bidder for each of the companioned advertisement slots may include allocating both the overlay slot and the companion slot to a bidder that submitted the maximum bid for both the overlay slot and the companion slot together if the maximum bid for both the overlay slot and the companion slot together is greater than or equal to the sum of the maximum bid for the overlay slot only and the maximum bid for the companion slot only. The auction may be selected from the group consisting of a partial information auction and a full information auction. The partial information auction and the full information auction may have the same expected efficiency. Determining the price may include determining a price that each winning bidder pays for their respective advertisement slot or slots according to a pricing scheme selected from the group consisting of: a Minimum Pay Property (MPP) pricing scheme, a Vickrey-Clarke-Groves like (VCG-like) pricing scheme, a Generalized Second Price like (GSP-like) pricing scheme, a Full Information Generalized Second Price (Full Info GSP) pricing scheme, and a Full Information Vickrey-Clarke-Groves like (Full Info VCG) pricing scheme.

Particular embodiments of the subject matter described in this specification can be implemented so as to realize one or more of the following advantages. Multiple advertisement slots, e.g., on a single web page, can more efficiently be allocated to a single advertiser or to different advertisers for each slot depending on bids. In some cases, means are provided for advertisers bidding for single or multiple advertisement slots in a way to maximize or increase the expected total value of the advertisements the publisher would obtain considering both advertisers that bid on single slots and advertisers that bid on multiple slots, while preserving the incentives for both types of advertisers to participate.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Content items (e.g., advertisements, text, audio, and/or video) are generated and presented to users in response to a request for content items. For example, content items are units of content that are presented in resources (e.g., web pages). Content items are content items that include content (e.g., advertising content) provided in two or more advertisement slots ("companioned advertisement slots"), e.g., on a single web page, by one or more advertisers.

Figure 1:
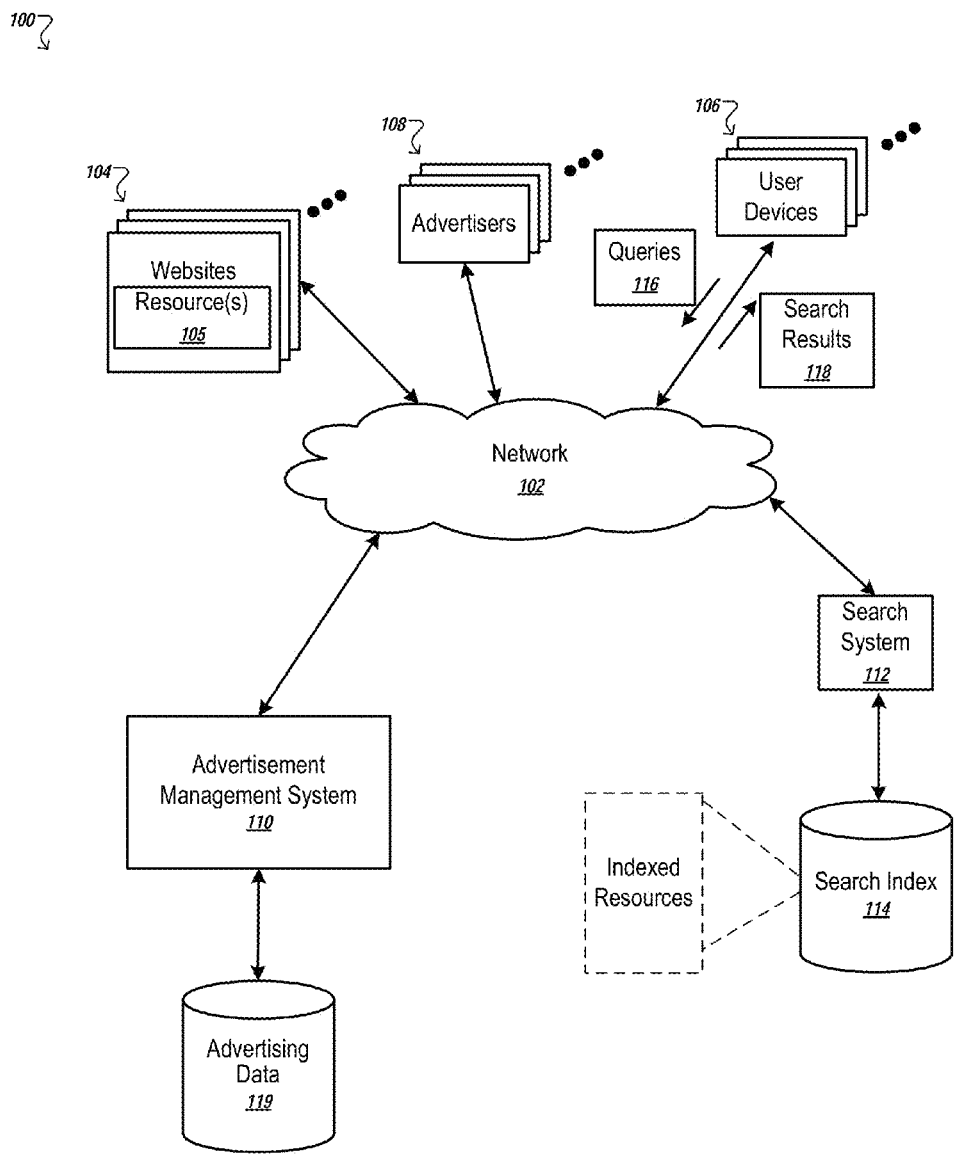
FIG. 1 is a block diagram of an example environment in which content items are distributed by a content distribution system.

FIG. 1 is a block diagram of an example environment 100 in which content items are distributed by a content distribution system. For example, the environment 100 includes an advertisement management system 110 that manages advertising services. The example environment 100 also includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts or other types of content. Each website 104 may be maintained by a publisher, which is an entity that controls, manages and/or owns the website 104.

A resource 105 is any medium that can be provided over the network 102. A resource 105 is identified by a resource address that is associated with the resource 105. Resources include HTML pages, word processing documents, and portable document format (PDF) documents, images, video, and feed sources, to name only a few. The resources can include content (i.e., information made available by an electronic medium or product), such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a specified area of a web page) in which advertisements can be presented. These specified portions of the resource or user display are referred to as advertisement slots.

User devices 106 can submit search queries 116 to the search system 112 over the network 102. In response, the search system 112 accesses a search index 114 to identify resources that are relevant to the search query 116. The search system 112 identifies the resources in the form of search results 118 and returns the search results 118 to the user devices 106 in search results pages. In general, a search result can be considered data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results 118 are requested by a user device 106, the advertisement management system 110 receives a request from a publisher for advertisements to be provided with the resource 105 or search results 118. The request for advertisements can include characteristics of the advertisement slots that are defined for the requested resource or search results page, and can be provided to the advertisement management system 110. For example, a reference (e.g., Uniform Resource Locator (URL)) to the resource for which the advertisement slot is defined, a size of the advertisement slot, and/or media types that are available for presentation in the advertisement slot can be provided to the advertisement management system 110. Similarly, keywords associated with a requested resource (referred to as resource keywords) or a search query 116 for which search results are requested can also be provided to the advertisement management system 110 to facilitate identification of advertisements that are relevant to the resource or search query 116.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries 116. In some implementations, advertisements having targeting keywords (i.e., keywords associated with the subject matter of the advertisement) that match the resource keywords or the search query 116 are selected as eligible advertisements by the advertisement management system 110.

A targeting keyword can match a resource keyword or a search query 116 by having the same textual content (e.g., same words, phrases, etc.) as the resource keyword or search query 116. The relevance can be based on root stemming, semantic matching, and topic matching or one or more other matching schemes. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" may also be selected as an eligible advertisement for an advertisement request including a resource keyword or search query for "sports" because hockey is a type of sport, and therefore, is likely to be relevant to the term "sports."

Targeting keywords and other data associated with the distribution of advertisements can be stored in an advertising data store 119. The advertising data store 119 is a data store that stores associations of advertisements, advertising campaign parameters that are used to control distribution of the advertisements, data representing conditions under which the advertisement was selected for presentation to a user, and data representing actions taken by users in response to presentation of the advertisement.

For example, the advertising data store 119 can store targeting keywords, bids, and other criteria with which eligible advertisements are selected for presentation. The advertising data store 119 can also store data specifying targeting keywords that caused presentation of the advertisement (e.g., that matched a resource keyword or search query), advertisement slots in which the advertisement appeared, characteristics (e.g., locations and sizes) of the advertisement slots, and any special features that might have been applied to the advertisement.

Example features that can be applied to an advertisement include the advertisement being presented with an image, the advertisement being presented with (e.g., adjacent to) multiple links (e.g., hypertext links) to different landing pages for the advertiser, or the advertisement being provided with a link that, in response to selection of the link, causes the advertisement to expand and revealing additional information associated with the advertisement (e.g., revealing a map, presenting a video clip, or providing product purchasing information).

The advertising data store 119 can also store user interaction data specifying user interactions with presented advertisements (or other content items). For example, when an advertisement is presented to the user, data can be stored in the advertisement data store 119 representing the advertisement impression. In some implementations, the data is stored in response to a request for the advertisement that is presented. For example, the ad request can include data identifying a particular cookie (i.e., a computer file containing information about a user), such that data identifying the cookie can be stored in association with data that identifies the advertisement(s) that were presented in response to the request.

When a user selects (e.g., clicks) a presented advertisement, data is stored in the advertisement data store 119 representing the user selection of the advertisement. In some implementations, the data is stored in response to a request for a web page that is linked to the advertisement. For example, the user selection of the advertisement can initiate a request for presentation of a web page that is provided by (or for) the advertiser. The request can include data identifying the particular cookie for the user device, and this data can be stored in the advertisement data store.

The advertisement management system 110 can select the eligible advertisements that are provided for presentation in advertisement slots of a resource or search results page based on results of an auction. For example, the advertisement management system 110 can receive bids for advertisers and allocate the advertisement slots to the auction winners at the conclusion of the auction. The bids can be considered amounts (e.g., maximum prices) that the advertisers will pay for presentation (or selection) of their advertisement with a resource or search results page. For example, a bid can specify an amount that an advertiser will to pay for each one thousand impressions of the advertisement, referred to as a CPM bid. An impression is the display (serving) of an online ad. Alternatively, the bid can specify an amount that the advertiser is willing to pay for user selection (i.e., a click-through) of the advertisement or a "conversion" (e.g., when a user performs a particular action related to an advertisement provided with a resource or search results page) following selection of the advertisement.

As described above, advertisers 108 can submit, to the advertisement management system 110, campaign parameters (e.g., targeting keywords and corresponding bids) that are used to control distribution of advertisements. Campaign parameters are parameters corresponding to a content distribution campaign that are used to control content selection in response to content requests. For example, campaign parameters can include targeting keywords and corresponding bids, geographic or demographic targeting criteria, as well as other parameters corresponding to a set of advertisements. A campaign is a set of one or more advertisements and corresponding campaign parameters that are grouped together into a same advertising unit. For example, advertisements for different types of sporting equipment can be grouped together into a campaign.

Within a campaign, subsets of the advertisements can be grouped into "ad groups." For example, an ad group in the above-referenced sports equipment campaign can include a set of advertisements that are each directed to baseball equipment. The campaign parameters corresponding to each ad group can be referred to as ad group parameters and, because ad group parameters are a subset of campaign parameters, changes to ad group parameters constitute changes to campaign parameters.

The advertisers 108 can also access to the advertisement management system 110 to monitor performance measures for the advertisements that are distributed using the campaign parameters. For example, an advertiser can access a campaign performance report that provides quantities of impressions (e.g., presentations), user selections (e.g., clicks), and conversions that have been identified for the advertisements. The campaign performance report can also provide a total cost, a cost-per-click, and other cost measures for the advertisement over a specified period of time. The content performance report can delineate the performance measures for the advertisements on a per-targeting-keyword basis so that the advertiser can compare the performance measures for advertisements associated with different targeting keywords.

Figure 2:
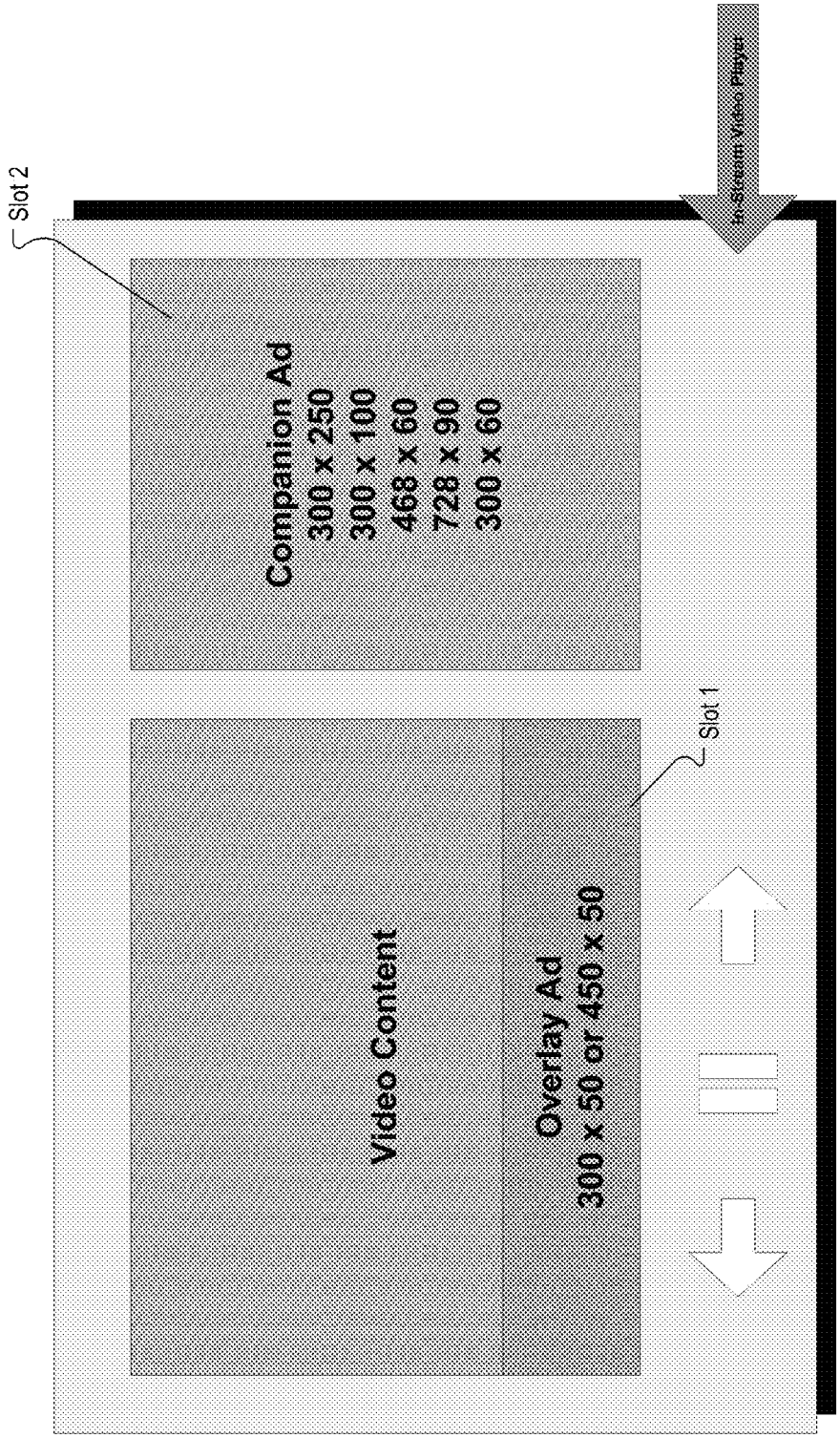
FIG. 2 is a screen shot of an example in-stream video player of a video-sharing website.

Display slots for content items (e.g., advertisements) are often sold in marketplaces or exchanges that auction each slot separately. However, display slots sometimes come in tightly coupled bundles. An example is in well known video-sharing websites, such as YouTube™. FIG. 2 is a screen shot of an example in-stream video player of a video-sharing website. In addition to a video content window, where, for example, user uploaded video is displayed, there is also an overlay advertisement slot (slot 1) on the video content window, as well as a companion advertisement slot (slot 2) on a right-hand side of the video content window. In some cases, for example, advertisers can upload an optional companion image or flash ads in addition to an overlay advertisement. Then, overlay advertisements can be treated as master advertisements, and companion advertisements can be treated as slave advertisements. In other words, whenever the master advertisement is shown the associated slave advertisement is also shown.

When it comes to the auctioning of the available companioned advertising space (e.g., slot 1 and slot 2), advertisers may be single minded and wish to bid for both slot 1 and slot 2, or may wish to bid only for slot 1 or slot 2. An auction for the two advertisement slots of FIG. 2 can be conducted as either a partial information auction or as a full information auction.

§1. Partial Information Auction

In a partial information auction, auctions for each available advertisement slot are conducted separately. Thus, for any particular auction of one advertisement slot, only estimates are available for another, separate auction of another advertisement slot. For example, information derived from the auction of slot 1, such as the maximum bid for slot 1, is unknown to the auction of slot 2 and vice-versa.

Figure 3:
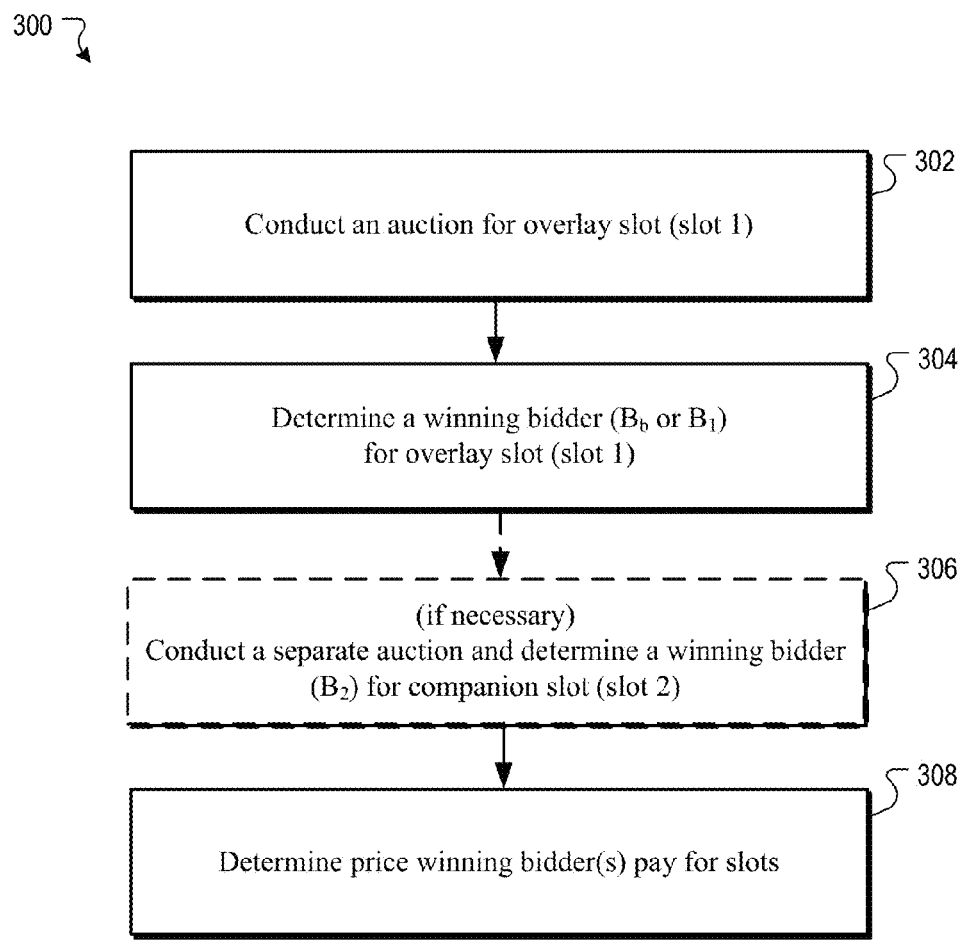
FIG. 3 is a flow chart of an example process for auctioning companioned advertisement slots in a partial information auction.

FIG. 3 is a flow chart of an example process for auctioning companioned advertisement slots in a partial information auction. The process can be implemented, for example, by the advertisement management system 110 of FIG. 1.

First, stage 302 conducts an auction for the overlay slot (slot 1). At this stage, bidders (advertisers) will have two bidding options: (i) submit a bid for slot 1 only, or (2) submit a combined bid for both slot 1 and slot 2.

Stage 304 determines a winning bidder for slot 1. An issue arises here in that there are bidders that are effectively bidding on two different things (i.e., some bidders are bidding on slot 1 only, while other bidders are bidding on the combination of slot 1 and slot 2 together). This issue can be reconciled by using an estimated bid value for slot 2. For the partial information auction, the winning bidder can be determined from the following equation:

$$\max\{b_1, r_1\} + \max\{X_2, r_2\} \leq b_b \quad (1)$$

If equation (1) is true, then the bidder (advertiser) $B_b$ that bid $b_b$ is the winning bidder for both slot 1 and slot 2, and those slots are allocated to $B_b$. Else, the bidder $B_1$ that bid $b_1$ is the winning bidder, so long as $b_1$ exceeds the reserve price $r_1$, in which case slot 1 is allocated to $B_1$, and then a second auction proceeds for slot 2.

In equation (1), $b_1$ is the maximum bid for slot 1 from bidders who bid only for slot 1;

$r_1$ is the reserve price, a minimum bid value set by the publisher, for slot 1;

$r_2$ is the reserve price, a minimum bid value set by the publisher, for slot 2;

$X_2$ is an expected maximum bid from bidders who bid for slot 2 only; and $b_b$ the maximum bid for slot 1 and slot 2, together, from bidders who bid on both.

The reserve prices $r_1$ and $r_2$ for slot 1 and slot 2, respectively, are known values that are provided by the publisher prior to the auction. $X_2$, an estimated value, can be determined using experiments, forecasting, predictions, statistical methods, etc.

Alternatively, in some cases, the expected maximum bid $X_2$ can be dropped from the equation, in which case the reserve price $r_2$ for slot 2 can be used as an estimated maximum bid for slot 2 and the equation is simplified to the following equation:

$$\max\{b_1, r_1\} + r_2 \leq b_b \quad (2)$$

If equation (2) is true, then the bidder (advertiser) $B_b$ that bid $b_b$ is the winning bidder for both slot 1 and slot 2. Else, the bidder $B_1$ that bid $b_1$ is the winning bidder for slot 1, so long as $b_1$ exceeds the reserve price $r_1$ for that advertisement slot, and then a second auction proceeds for slot 2, as represented by Stage 306 shown in dashed lines.

Stage 308 determines the price that each winning bidder pays for their respective slots. Tables 1 through 3 (below) illustrate various pricing schemes for determining the price(s) that the winning bidder or winning bidders will pay. For example, Table 1 illustrates a Minimum Pay Property (MPP) pricing scheme for determining what each party will pay for the advertisement slots allocated to them.

TABLE 1

| Winner | MPP Price |
| --- | --- |
| $B_b$ | $b_1 + X_2$ |
| $B_1$ | $\max\{b_{12}, b_b - X_2\}$, |
| $B_2$ | $\min\{\max\{b_{22}, b_b - X_1\}, b_2\}$, |

As can be derived from Table 1, if the winning bidder is $B_b$, then the price that $B_b$ pays for the combination of slot 1 and slot 2 is $b_1 + X_2$.

If, on the other hand, $B_1$ is the winning bidder for slot 1, then, under the MPP pricing scheme of Table 1, the price that $B_1$ will pay for slot 1 will be determined from the following: $\max\{b_{12}, b_b - X_2\}$, where $b_{12}$ is the second largest bid for slot 1 alone. In this case, $B_2$ would represent the winning bidder of a separate auction for slot 2, and the price that $B_2$ will pay for slot 2, under the MPP pricing scheme of Table 1, will be determined from the following: $\min\{\max\{b_{22}, b_b - X_1\}, b_2\}$, where $b_{22}$ is the second largest bid for slot 2 alone, and $X_1$ is an expected maximum bid from bidders who bid for slot 1 only. $X_1$, an estimated value, can be determined using experiments, forecasting, predictions, statistical methods, etc. In some cases, the expected maximum bids $X_1$ and $X_2$ can be dropped from the equations, and can, instead, be replaced with the reserve prices $r_1$ and $r_2$, respectively.

Table 2 (below) illustrates an alternative pricing scheme, a Vickrey-Clarke-Groves like (VCG-like) pricing scheme, for determining what each party will pay for the advertisement slots allocated to them.

TABLE 2

| Winner | VCG-like Price |
| --- | --- |
| $B_b$ | $b_1 + X_2$ |
| $B_1$ | $\max(b_{12}, \max(b_b, X_2) - X_2)$ |
| $B_2$ | $\min(\max(b_b, X_1) - X_1, b_2)$ |

As can be derived from Table 2, under a VCG-like pricing scheme, if the winning bidder is $B_b$, then the price that $B_b$ pays for the combination of slot 1 and slot 2 is $b_1 + X_2$.

If, on the other hand, $B_1$ is the winning bidder for slot 1, then, under the VCG-like pricing scheme of Table 2, the price that $B_1$ will pay for slot 1, will be determined from the following: $\max\{b_b, X_2\} - X_2$. In this case, $B_2$ would represent the winning bidder of a separate auction for slot 2, and the price that B2 will pay for slot 2, under the VCG-like pricing scheme of Table 2, will be determined from the following: $\min\{\max\{b_b, X_1\} - X_1, b_2\}$.

Table 3 (below) illustrates a third alternative pricing scheme, a Generalized Second Price like (GSP-like) pricing scheme, for determining what each party will pay for the advertisement slots allocated to them.

TABLE 3

| Winner | GSP-Like Price |
|---|---|
| $B_b$ | $b_1 + X_2$ |
| $B_1$ | $\max\{b_{12}, b_b - p_2\}$ |
| $B_2$ | $\min\{\max\{b_{22}, X_b - p_1\}, b_2\}$ |

As can be derived from Table 3, under a GSP-like pricing scheme, if the winning bidder is $B_b$, then the price that $B_b$ pays for the combination of slot 1 and slot 2 is $b_1 + X_2$.

If, on the other hand, $B_1$ is the winning bidder for slot 1, then, under the GSP-like pricing scheme of Table 3, the price that $B_1$ will pay for slot 1, will be determined from the following: $\max\{b_{12}, b_b - p_2\}$, where $p_2$ is the expected price paid for slot 2 from winners who only bid on slot 2. $p_2$ is another estimated value that can be determined using experiments, forecasting, predictions, statistical methods, etc. In this case, $B_2$ would represent the winning bidder of a separate auction for slot 2, and the price that $B_2$ will pay for slot 2, under the GSP-like pricing scheme of Table 3, will be determined from the following: $\min\{\max\{b_{22}, X_b - p_1\}, b_2\}$, where $X_b$ is an expected maximum bid from bidders who bid for both slot 1 and slot 2 together, and $p_1$ is the expected price paid for slot 1 from winners who only bid on slot 1.

§2. Full Information Auction

Figure 4:
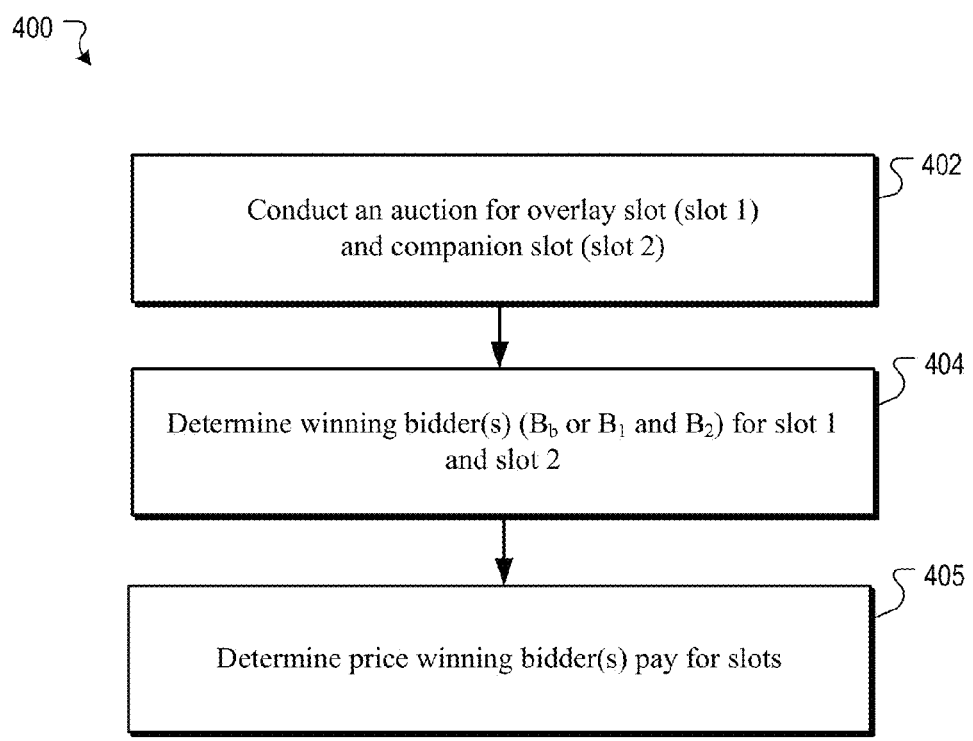
FIG. 4 is a flow chart of an example process for auctioning companioned advertisement slots in a full information auction.

In a full information auction, auctions for both advertisement slots (slot 1 and slot 2) are conducted together. FIG. 4 is a flow chart of an example process for auctioning off companioned advertisement slots in a full information auction. The process can be implemented, for example, by the advertisement management system 110 of FIG. 1.

First, stage 402 conducts an auction for the overlay slot (slot 1) and the companion slot (slot 2). The auction includes three sub-auctions (i) one sub-auction for the overlay slot (slot 1) only, (ii) a second sub-auction for the companion slot (slot 2) only, (iii) and a third sub-auction for the overlay slot and the companion slot together.

Stage 404 determines a winning bidder or winning bidders for slots 1 and 2. For the full information auction, the winning bidder can be determined from the following equation:

$$\max\{b_1, r_1\} + \max\{b_2, r_2\} \leq b_b \qquad (3)$$

If equation (3) is true, then the bidder (advertiser) $B_b$ that bid $b_b$ is the winning bidder for both slot 1 and slot 2, and those slots are allocated to $B_b$. Else, the bidder $B_1$ that bid $b_1$ is the winning bidder for slot 1, so long as $b_1$ exceeds the reserve price $r_1$, and bidder $B_2$ that bid $b_2$ is the winning bidder for slot 2, so long as $b_2$ exceeds the reserve price $r_2$.

In equation (3), $b_1$ is the maximum bid for slot 1 from bidders who bid only for slot 1;

$r_1$ is the reserve price, a minimum bid value set by the publisher, for slot 1;

$r_2$ is the reserve price, a minimum bid value set by the publisher, for slot 2;

$b_2$ is the maximum bid for slot 2 from bidders who bid only for slot 2; and $b_b$ the maximum bid for slot 1 and slot 2, together, from bidders who bid on both.

The reserve prices $r_1$ and $r_2$ for slot 1 and slot 2, respectively, are known values that are provided by the publisher (e.g., YouTube™) prior to the auction.

Stage 406 determines the price that each winning bidder pays for their respective slots. Tables 4 and 5 (below) illustrate alternative pricing schemes for determining the price(s) that the winning bidder or winning bidders will pay in a full information auction. For example, Table 4 illustrates a Full Information Generalized Second Price (Full Info GSP) pricing scheme for determining what each party will pay for the advertisement slots allocated to them.

TABLE 4

| Winner | Full Info GSP Price |
|---|---|
| $B_b$ | $b_1 + b_2$ |
| $B_1$ | $\max\{b_{12}, b_{12} + ((b_b - b_{12} - b_{22})/2)\}$ |
| $B_2$ | $\max\{b_{22}, b_{22} + ((b_b - b_{12} - b_{22})/2)\}$ |

As can be derived from Table 4, if the winning bidder is $B_b$, then the price that $B_b$ pays for the combination of slot 1 and slot 2 is $b_1 + b_2$.

If, on the other hand, $B_1$ is the winning bidder for slot 1, then, under the Full Info GSP pricing scheme of Table 4, the price that B1 will pay for slot 1 will be determined from the following: $\max\{b_{12}, b_{12} + ((b_b - b_{12} - b_{22})/2)\}$, where $b_{12}$ is the second largest bid for slot 1 alone, and $b_{22}$ is the second largest bid for slot 2 alone. In this case, $B_2$ would represent the winning bidder for slot 2, and the price that $B_2$ will pay for slot 2, under Full Info GSP pricing scheme of Table 4, will be determined from the following: $\max\{b_{22}, b_{22} + ((b_b - b_{12} - b_{22})/2)\}$.

Table 5 (below) illustrates an alternative pricing scheme, a Full Information Vickrey-Clarke-Groves (Full Info VCG) pricing scheme, for determining what each party will pay for the advertisement slot(s) allocated to them.

TABLE 5

| Winner | Full Info VCG Price |
|---|---|
| $B_b$ | $b_1 + b_2$ |
| $B_1$ | $\max(b_{12}, \max(b_b, b_2) - b_2)$ |
| $B_2$ | $\max(b_{22}, \max(b_b, b_1) - b_1)$ |

As can be derived from Table 5, under a Full Info VCG pricing scheme, if the winning bidder is Bb, then the price that $B_b$ pays for the combination of slot 1 and slot 2 is $b_1 + b_2$.

Figure 5:
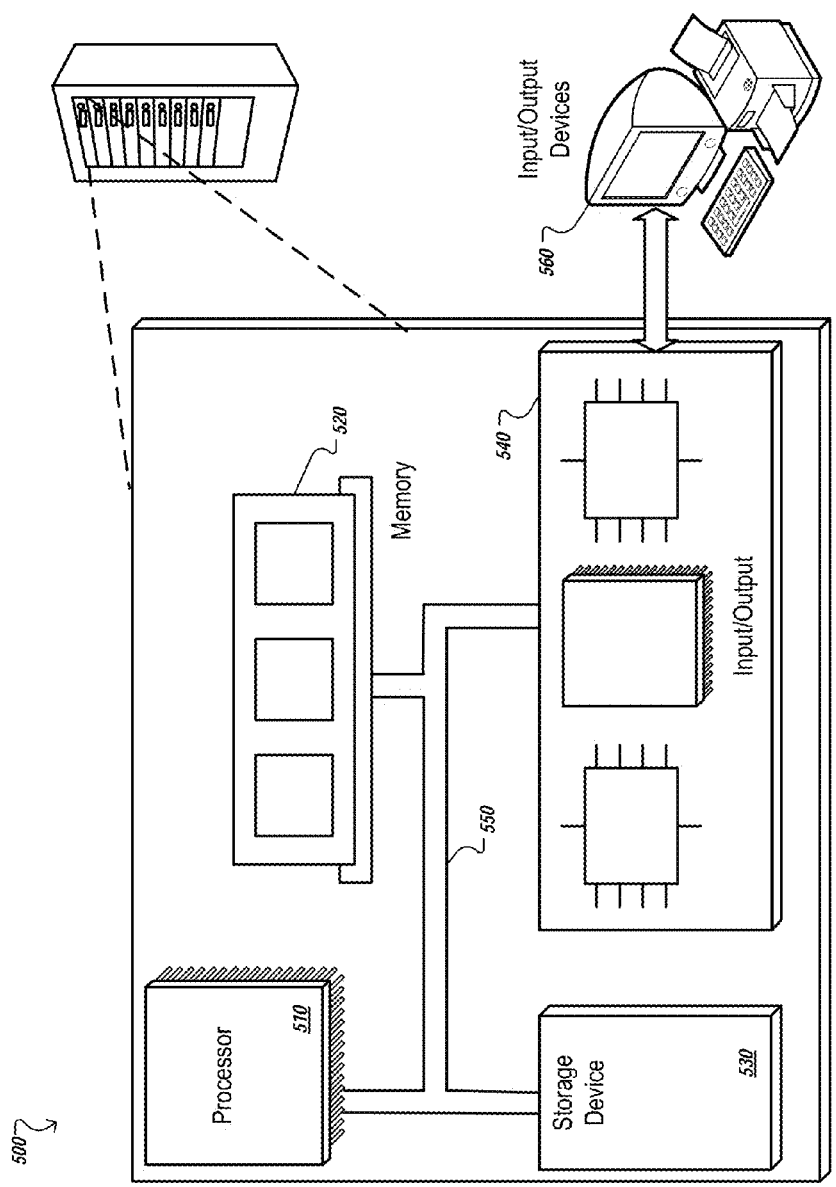
FIG. 5 is a block diagram of an example computer system that can be used to distribute content items.

If, on the other hand, $B_1$ is the winning bidder for slot 1, then, under the Full Info VCG pricing scheme of Table 5, the price that $B_1$ will pay for slot 1, will be determined from the following: $\max(b_{12}, \max(b_b, b_2) - b_2)$. And, in this case, $B_2$ would represent the winning bidder for slot 2. The price that $B_2$ will pay for slot 2, under the Full Info VCG pricing scheme of Table 5, will be determined from the following: $\max(b_{22}, \max(b_b, b_1) - b_1)$. FIG. 5 is block diagram of an example computer system 500 that can be used to distribute content items. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   conducting, by one or more computers, an online auction that allows bidders to bid on companioned advertisement slots that comprise a first slot and a second slot on a web page;
   determining, by one or more computers, a winning bidder for each of the companioned advertisement slots on the web page; and
   determining, by one or more computers, a price that each winning bidder pays for their respective advertisement slot or slots,
   wherein conducting the auction comprises receiving bids for the first slot only, receiving bids for both the first slot and the second slot together, and receiving bids for the second slot only; and
   further wherein determining the winning bidder for each of the companioned advertisement slots comprises comparing the maximum bid for the first slot and the second slot together to the sum of the maximum bid for the first slot only and the maximum bid for the second slot only.

2. The method of claim 1, wherein determining a winning bidder for each of the companioned advertisement slots comprises allocating both the first slot and the second slot to a single bidder.

3. The method of claim 1, wherein determining the winning bidder for each companioned advertising slot comprises comparing a maximum bid received for the first slot and the second slot together with a maximum bid received for the first slot only.

4. The method of claim 1, further comprising determining an expected maximum bid for the second slot only, and wherein determining the winning bidder for each of the companioned advertising slots comprises comparing a maximum bid for both the first slot and the second slot together to the sum of the maximum bid for the first slot only and the expected maximum bid for the second slot only.

5. The method of claim 4, wherein determining the winning bidder for each of the companioned advertisement slots comprises allocating both the first slot and the second slot to a bidder that submitted the maximum bid for both the first slot and the second slot together if the maximum bid received for both the first slot and the second slot together is greater than or equal to the sum of the maximum bid for the first slot only and the expected maximum bid for the second slot only.

6. The method of claim 1, wherein determining the winning bidder for each of the companioned advertisement slots comprises allocating both the first slot and the second slot to a bidder that submitted the maximum bid for both the first slot and the second slot together if the maximum bid for both the first slot and the second slot together is greater than or equal to the sum of the maximum bid for the first slot only and the maximum bid for the second slot only.

7. The method of claim 1, wherein the auction is selected from the group consisting of a partial information auction and a full information auction.

8. The method of claim 1, wherein determining the price comprises determining a price that each winning bidder pays for their respective advertisement slot or slots according to a pricing scheme selected from the group consisting of: a Minimum Pay Property (MPP) pricing scheme, a VickreyClarke-Groves like (VCG-like) pricing scheme, a Generalized Second Price like (GSP-like) pricing scheme, a Full Information Generalized Second Price (Full Info GSP) pricing scheme, and a Full Information Vickrey-Clarke-Groves like (Full Info VCG) pricing scheme.

9. A system comprising:
   one or more computers and one or more storage devices storing instructions that are operable, when executed by the one or more computers, to cause the one or more computers to perform operations comprising:

conducting an online auction that allows bidders to bid on companioned advertisement slots that comprise a first slot and a second slot on a web page;

determining a winning bidder for each of the companioned advertisement slots on the web page; and determining a price that each winning bidder pays for their respective advertisement slot or slots wherein conducting the auction comprises receiving bids for the first slot only, receiving bids for both the first slot and the second slot together, and receiving bids for the second slot only; and further wherein determining the winning bidder for each of the companioned advertisement slots comprises comparing the maximum bid for the first slot and the second slot together to the sum of the maximum bid for the first slot only and the maximum bid for the second slot only.

10. The system of claim 9, wherein determining a winning bidder for each of the companioned advertisement slots comprises allocating both the first slot and the second slot to a single bidder.

11. The system of claim 9, wherein determining the winning bidder for each companioned advertising slot comprises comparing a maximum bid received for the first slot and the second slot together with a maximum bid received for the first slot only.

12. The system of claim 9, further comprising determining an expected maximum bid for the second slot only, and wherein determining the winning bidder for each of the companioned advertising slots comprises comparing a maximum bid for both the first slot and the second slot together to the sum of the maximum bid for the first slot only and the expected maximum bid for the second slot only.

13. The system of claim 12, wherein determining the winning bidder for each of the companioned advertisement slots comprises allocating both the first slot and the second slot to a bidder that submitted the maximum bid for both the first slot and the second slot together if the maximum bid received for both the first slot and the second slot together is greater than or equal to the sum of the maximum bid for the first slot only and the expected maximum bid for the second slot only.

14. The system of claim 9, wherein determining the winning bidder for each of the companioned advertisement slots comprises allocating both the first slot and the second slot to a bidder that submitted the maximum bid for both the first slot and the second slot together if the maximum bid for both the first slot and the second slot together is greater than or equal to the sum of the maximum bid for the first slot only and the maximum bid for the second slot only.

15. The system of claim 9, wherein the auction is selected from the group consisting of a partial information auction and a full information auction.

16. The system of claim 9, wherein determining the price comprises determining a price that each winning bidder pays for their respective advertisement slot or slots according to a pricing scheme selected from the group consisting of: a Minimum Pay Property (MPP) pricing scheme, a VickreyClarke-Groves like (VCG-like) pricing scheme, a Generalized Second Price like (GSP-like) pricing scheme, a Full Information Generalized Second Price (Full Info GSP) pricing scheme, and a Full Information Vickrey-Clarke-Groves like (Full Info VCG) pricing scheme.

17. A non-transitory computer storage medium encoded with computer program instructions that when executed by one or more computers cause the one or more computers to perform operations comprising:

conducting by one or more computers, an online auction that allows bidders to bid on companioned advertisement slots that comprise a first slot and a second slot on a web page;

determining by one or more computers, a winning bidder for each of the companioned advertisement slots on the web page; and determining by one or more computers, a price that each winning bidder pays for their respective advertisement slot or slots wherein conducting the auction comprises receiving bids for the first slot only, receiving bids for both the first slot and the second slot together, and receiving bids for the second slot only; and further wherein determining the winning bidder for each of the companioned advertisement slots comprises comparing the maximum bid for the first slot and the second slot together to the sum of the maximum bid for the first slot only and the maximum bid for the second slot only.

18. The medium of claim 17, wherein determining a winning bidder for each of the companioned advertisement slots comprises allocating both the first slot and the second slot to a single bidder.

19. The medium of claim 18, wherein determining the winning bidder for each companioned advertising slot comprises comparing a maximum bid received for the first slot and the second slot together with a maximum bid received for the first slot only.

20. The medium of claim 18, further comprising determining an expected maximum bid for the second slot only, and wherein determining the winning bidder for each of the companioned advertising slots comprises comparing a maximum bid for both the first slot and the second slot together to the sum of the maximum bid for the first slot only and the expected maximum bid for the second slot only.

21. The medium of claim 20, wherein determining the winning bidder for each of the companioned advertisement slots comprises allocating both the first slot and the second slot to a bidder that submitted the maximum bid for both the first slot and the second slot together if the maximum bid received for both the first slot and the second slot together is greater than or equal to the sum of the maximum bid for the first slot only and the expected maximum bid for the second slot only.

22. The medium of claim 17, wherein determining the winning bidder for each of the companioned advertisement slots comprises allocating both the first slot and the second slot to a bidder that submitted the maximum bid for both the first slot and the second slot together if the maximum bid for both the first slot and the second slot together is greater than or equal to the sum of the maximum bid for the first slot only and the maximum bid for the second slot only.

23. The medium of claim 17, wherein the auction is selected from the group consisting of a partial information auction and a full information auction.

24. The medium of claim 17, wherein determining the price comprises determining a price that each winning bidder pays for their respective advertisement slot or slots according to a pricing scheme selected from the group consisting of: a Minimum Pay Property (MPP) pricing scheme, a VickreyClarke-Groves like (VCG-like) pricing scheme, a Generalized Second Price like (GSP-like) pricing scheme, a Full Information Generalized Second Price (Full Info GSP) pricing scheme, and a Full Information Vickrey-Clarke-Groves like (Full Info VCG) pricing scheme.

* * * * *